United States Patent [19]

McBride

[11] Patent Number: 5,753,151

[45] Date of Patent: May 19, 1998

[54] METHOD AND APPARATUS FOR MOLDING COMPOSITE ARTICLES

[75] Inventor: Leonard McBride, St. Clair Beach, Canada

[73] Assignee: Windsor Mold Inc., Windsor, Canada

[21] Appl. No.: 653,843

[22] Filed: May 28, 1996

[51] Int. Cl.⁶ ................................................ B29C 45/16
[52] U.S. Cl. .................... 264/1.9; 264/247; 264/250; 425/126.1; 425/129.1; 425/588; 425/808
[58] Field of Search .................... 264/1.9, 247, 250; 425/126.1, 129.1, 572, 588, 808

[56] References Cited

U.S. PATENT DOCUMENTS

| | | | |
|---|---|---|---|
| 3,409,344 | 11/1968 | Balint et al. | 264/1.9 |
| 3,415,388 | 12/1968 | Hornlein et al. | 425/126.1 |
| 4,711,621 | 12/1987 | Schomblond | 425/120 |
| 4,865,793 | 9/1989 | Suzuki et al. | 264/278 |
| 4,960,374 | 10/1990 | Pröll | 425/119 |
| 5,037,597 | 8/1991 | McGinley et al. | 425/572 |
| 5,256,048 | 10/1993 | Jacobs et al. | 425/572 |
| 5,304,050 | 4/1994 | Vismara | 425/4 R |
| 5,320,511 | 6/1994 | Woerner | 425/130 |
| 5,472,655 | 12/1995 | Morita | 264/250 |

FOREIGN PATENT DOCUMENTS

| | | | |
|---|---|---|---|
| 0089675 | 9/1983 | European Pat. Off. | 264/250 |
| 60-245520 | 12/1985 | Japan | 264/250 |
| 62-50109 | 3/1987 | Japan | 425/126.1 |

*Primary Examiner*—Robert Davis
*Attorney, Agent, or Firm*—Gifford, Krass, Groh, Sprinkle, Patmore, Anderson & Citkowski, P.C.

[57] ABSTRACT

An injection molding process for the manufacture of composite, molded, thermoplastic articles comprising an insert member contiguous with a second body of molded thermoplastic material, is carried out in a mold assembly comprising a core member and a cavity member engageable therewith. The core and cavity members cooperate to define a first molding station having a first cavity for molding an insert member, and a second molding station which is configured to receive and support an insert member therein, and to provide a second molding cavity contiguous with the insert member for molding a thermoplastic body contiguous with the insert. At the start of the process, an insert is supported in the second station, and thermoplastic materials are injected into the molding cavities in the first and second stations so as to mold an insert and a completed, composite member. The core and cavity are separated, the completed, composite member removed, and the insert transferred from the first molding station to the second molding station, after which the core and cavity are reengaged and the process repeated. Also disclosed herein is an apparatus for carrying out the method.

17 Claims, 4 Drawing Sheets

METHOD AND APPARATUS FOR MOLDING COMPOSITE ARTICLES

FIELD OF THE INVENTION

This invention relates generally to injection molding processes. More specifically, the invention relates to a process in which a molten thermoplastic material is injected around a preformed member so as to form a composite article. Most specifically, the invention relates to a concerted process for molding a composite article in which all steps are carried out in a single molding apparatus using a single core/cavity assembly.

BACKGROUND OF THE INVENTION

Injection molding processes are used for the manufacture of a variety of objects. Frequently it is necessary to manufacture a composite article of the type which comprises a unitary body comprised of two different materials, or two materials molded under different conditions. In one approach to the injection molding of a composite article, an insert or preformed member is first prepared, and this member is then at least partially surrounded by, and bonded to, a remainder portion in an injection molding step. Composite molding processes are often used to manufacture multicolored, molded articles such as lenses for vehicular lights.

One prior art approach to the manufacture of composite articles involves two separate manufacturing steps. One such process is disclosed in U.S. Pat. No. 4,865,793. As shown therein, a preformed insert member is inserted into a mold and a molten thermoplastic injected into the mold to surround and bond to the insert member. This approach involves the preparation and storage of preformed inserts and subsequent placement of these inserts into a mold. The use of such separately prepared inserts requires the use of two separate molding apparatus, as well as the storage of the preformed inserts. While this approach is suitable for preparation of certain types of articles, it is not particularly well suited for the manufacture of precision and/or delicate items, since preformed inserts are subject to damage during storage and handling if not carefully packaged.

Another approach to the manufacture of composite, injection molded articles involves the use of a multistage molding apparatus. A number of such systems are known in the prior art and typically include a plurality of separate molding assemblies which are sequentially employed to build up the components of the composite article. For example, U.S. Pat. No. 5,320,511 discloses an injection molding apparatus in which a rotatable table sequentially carries a number of separate mold assemblies to a single injection apparatus. A generally similar system is shown in U.S. Pat. No. 4,960,374 which discloses a molding apparatus having a vertically rotatable table for carrying a workpiece between two separate molding assemblies. Yet another similar approach is shown in U.S. Pat. No. 5,304,050 which discloses an apparatus having a number of separate molding stations and further including a transfer mechanism for carrying a set of half-mold assemblies between the stations.

Yet another approach to the molding of composite articles is shown in U.S. Pat. No. 4,711,621. Disclosed therein is a system for the manufacture of multicolored vehicular light covers. The system includes a mold assembly having a number of sliding blocks therein which may be moved to sequentially open and close various portions of the mold. The blocks are placed in a first configuration to define a mold cavity for the injection molding of a first part of the composite article; after which, the blocks are moved to a second position so as to define a second cavity for molding the remainder portion of the article about the first portion. All of these prior art approaches involve the use of mechanically complex molds and/or mold transferring systems. Such systems are expensive to build and maintain.

According to the present invention, as will be described in greater detail hereinbelow, there is provided a method and apparatus for the manufacture of composite articles. The system of the present invention is mechanically simple, low in cost and reliable. The present invention is particularly well suited for the manufacture of high quality, precision molded components such as vehicular light covers. These and other advantages of the present invention will be readily apparent from the drawings, discussion and description which follow.

BRIEF DESCRIPTION OF THE INVENTION

There is disclosed herein a transfer molding process for making a composite, molded, thermoplastic member of the type which includes a molded, thermoplastic insert member contiguous with a second body of molded, thermoplastic material. The method includes a first step of providing a mold assembly which comprises a core member and a cavity member engageable therewith to define a first and second molding station. The first molding station includes a first mold cavity having a shape corresponding to an insert member, and a first injection port in fluid communication with the first mold cavity. The second molding station includes an insert receiving portion defined therein which is configured to support an insert member therein, and further includes a second mold cavity contiguous with the insert receiving portion. A second injection port is in fluid communication with the second mold cavity. In subsequent steps, a first insert member is disposed in the insert receiving portion of the second molding station; a first volume of molten thermoplastic polymer is injected into the first mold cavity through the first injection port so as to form a second insert member, and a second volume of molten thermoplastic material is injected into the second mold cavity, through the second injection port, so as to form a second body of thermoplastic material which is contiguous with the first insert that was previously placed in the second mold station. In this manner there is provided a composite, molded, thermoplastic member which incorporates the first insert. Finally, the composite, molded, thermoplastic member is removed from the second molding station and the second insert member which was molded in the first mold cavity is transferred to the insert receiving portion of the second molding station.

The steps of injecting the first and second volumes of thermoplastic polymer may be carried out substantially simultaneously, and the composition, as well as the temperature and/or pressure of the first and second volumes of thermoplastic polymer may be the same or different. Transfer of the insert and removal of the composite, molded article may be carried out by a robotic manipulator. In particular instances, the insert member may be supported in the second molding station so as to prevent contact of at least one surface of the insert with the walls of the second molding station so as to prevent any damage thereto.

Also disclosed herein is a transfer molding apparatus for carrying out the method of the present invention.

DETAILED DESCRIPTION OF THE INVENTION

Figure 1:
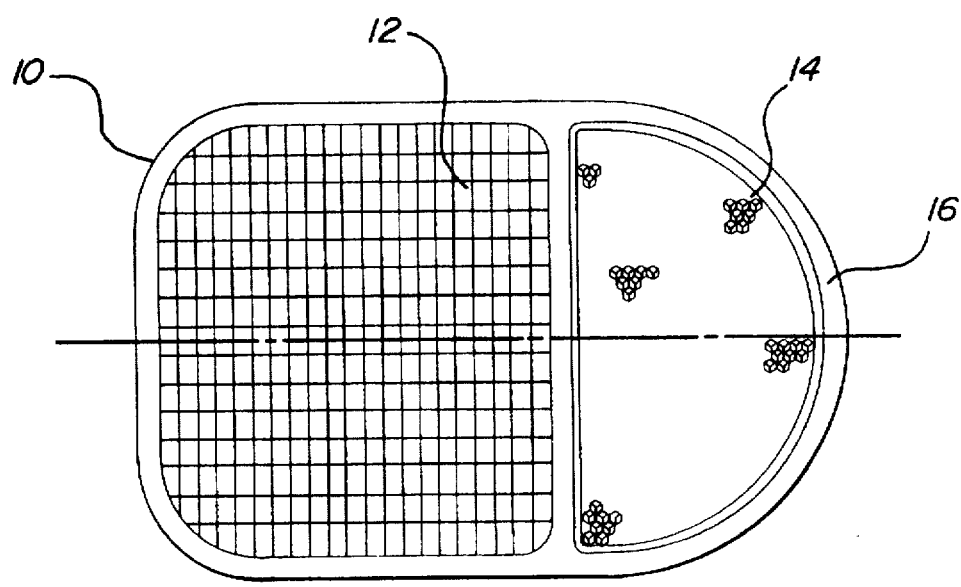
FIG. 1 is a perspective view of a vehicular lens assembly which may be manufactured through the use of the present invention.

The present invention may be employed for the manufacture of a variety of injection molded, composite articles, and it has particular advantage in the manufacture of high quality, precision articles such as vehicular light covers. Referring now to FIG. 1, there is shown a perspective view of a composite, injected molded vehicular light cover 10 (also referred to as a lens), manufactured through the use of the present invention. The light cover 10 includes a light diffusing portion 12 which is typically fabricated from a clear polymer such as an acrylic; although polycarbonate or any other such thermoplastic may be employed. The light diffusing portion 12 includes a plurality of molded-in lens elements for dispersing light from a bulb positioned therebehind. The light cover 10 further includes a reflective portion, referred to in the art as a reflex, 14. The reflex portion 14 is typically fabricated from a colored polymer such as an amber or red tinted acrylic. The reflex portion includes a plurality of corner cube elements molded therein. As is known in the art, these elements function to reflect a beam of light back along its axis of incidence. Inclusion of reflex elements in vehicular applications is typically mandated by law, and standards for the reflectivity of such elements are specified by governmental code. The light cover 10 of FIG. 1 is a unitary body in which the reflex portion 14 is surrounded by, and bonded to, a clear polymer which defines a rim 16 surrounding both the light diffusing portion 12 and the reflex portion 14 of the light cover 10.

The corner cube elements on the reflex portion 14 include a plurality of facets which meet to form right angles. In the manufacture of the light cover 10 it is important to avoid damaging these facets, since any significant deformation thereof can adversely affect the reflective properties of the reflex element 14. If the element is to be stored, care must be taken to prevent mechanical harm to the molded facets. Also, care must be taken in subsequent molding steps to prevent harm to the facets, and this problem is compounded by the fact that the high pressures and temperatures involved in molding steps tend to soften the thermoplastic material comprising the reflex 14 and hence further exacerbate the risk of deformation.

It is notable that the molding process of the present invention is carried out in a single core/cavity assembly, and that it is a concerted process which does not require storage of insert members, but utilizes them as they are produced. It is a further important feature of the present invention that the process and apparatus are optimized to prevent damage to critical optical surfaces, such as the corner cube portion of a reflex assembly.

Figure 2A:
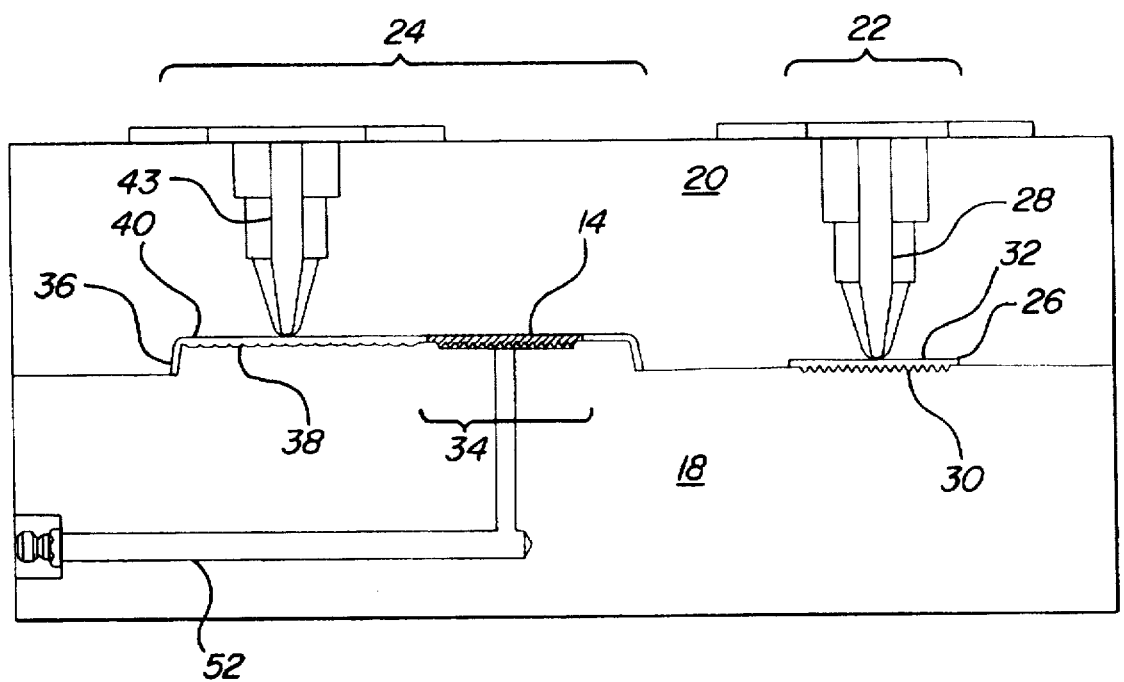
FIGS. 2a–2c are schematic depictions of sequential steps in the process of the present invention.
Figure 2B:
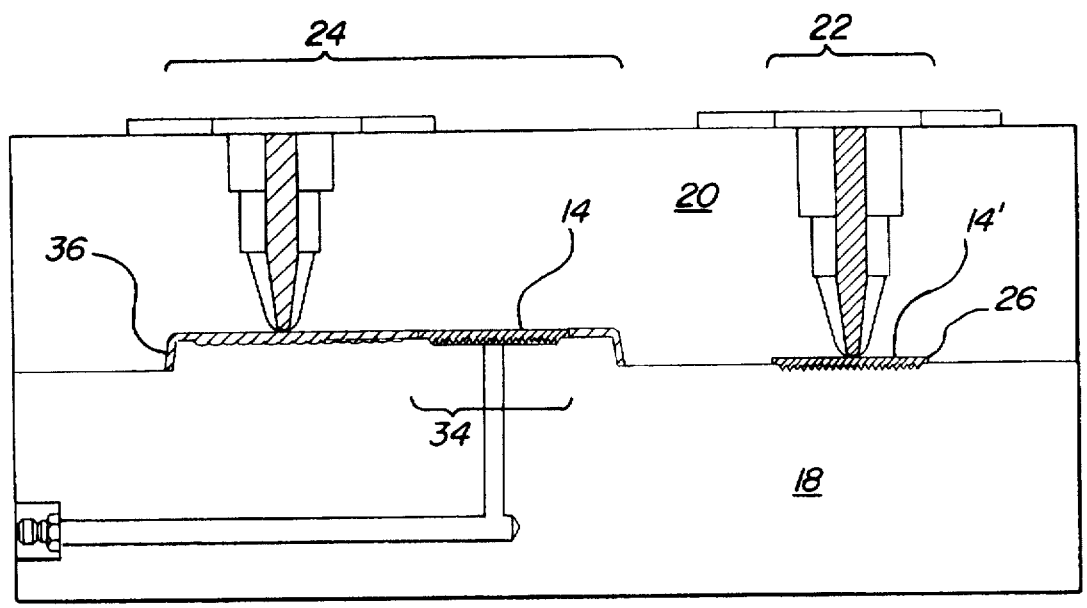
Figure 2C:
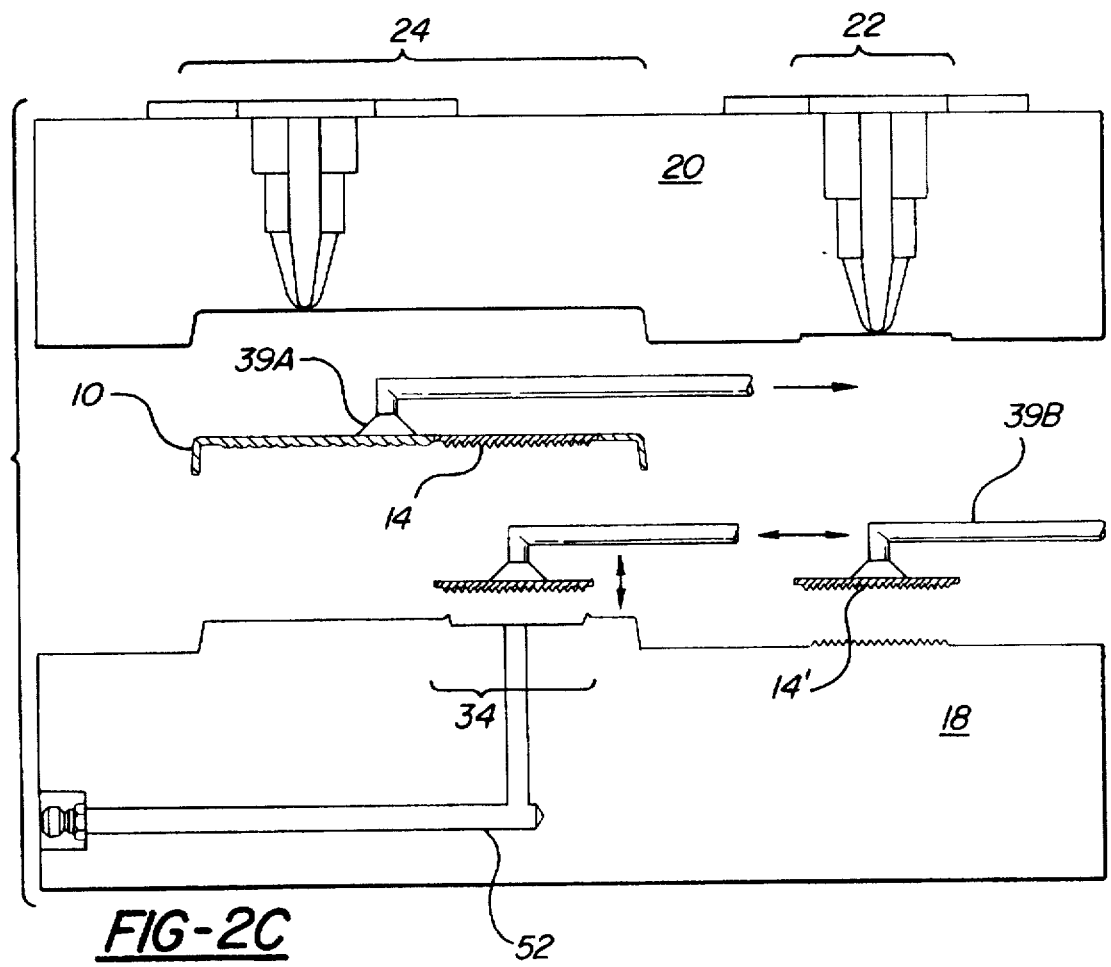

Referring now to FIGS. 2a–2c there is shown a schematic depiction of a transfer molding process carried out in accord with the present invention. The process is carried out in a mold assembly which includes a core member 18 and a cavity member 20. These members 18, 20 cooperate, when engaged, to define a first molding station 22 and a second molding station 24. It is to be understood that the terms "core" and "cavity" are relative terms in the art and may be applied to either member of the pair; although, in keeping with standard convention, the movable element will generally be referred to herein as the core and the stationary element as the cavity.

The first molding station 22 defined by the core 18 and cavity 20 includes a first mold cavity 26 therein, and this cavity 26 includes an injection port 28 in fluid communication therewith. In the illustrated embodiment, the first mold cavity 26 is configured to correspond to the shape of a reflex element, and it will be noted from FIG. 2a that a back surface thereof 30 is textured to provide the corner cube elements and the front surface thereof 32 is smooth.

The second molding station 24 includes an insert receiving portion 34 configured to receive and support an insert member, in this case a reflex element 14. The second molding station further includes a second mold cavity 36 defined therein so as to be contiguous with the insert receiving portion 34. In the embodiment of FIGS. 2a–2c, the second mold cavity 36 corresponds generally to the remainder of the light cover 10 of FIG. 1. A textured back surface 38 corresponds to the light diffusing elements of the light diffusing portion 12 of the light cover 10. A front surface 40 of the mold cavity 36 is provided with a smooth finish corresponding to the exterior surface of the light cover 10. An injection port 43 is in fluid communication with the second mold cavity 36.

FIG. 2a depicts the first step in the process of the present invention. As illustrated therein, an insert member, in this case comprising a reflex element 14, is disposed in the insert receiving portion 34 of the second mold station 24. The illustrated embodiment includes a vacuum line 52, in communication with the insert receiving portion 34. This vacuum line 52 assists in retaining the reflex element 14 in the second mold station 24; although it is to be understood that this vacuum line 52 is optional. The first mold cavity 30 and second mold cavity 36 are both empty in this step.

Referring now to FIG. 2b, there is shown a second step in the process, and in this step a first volume of a molten, thermoplastic material is injected into the first mold cavity 26 to form a second reflex element 14'. A second volume of molten, thermoplastic material is injected into the second mold cavity 36 so as to form a second body of thermoplastic material which bonds to the first reflex member 14 supported on the insert receiving portion 34, in the second molding station 24.

Referring now to FIG. 2c, there is shown a third step in the process, and as illustrated, the core 18 and cavity 20 are separated. The method forms a molded, composite article, which in this instance comprises a lamp cover 10, which is then removed from the second molding station, typically by a robot arm 39a which grasps the front surface thereof by suction cups or other such means. The thus prepared composite article incorporates the first insert 14. The second insert 14' which was molded in the first molding station 22 is transferred to the insert receiving portion 34 of the second molding station 24, also preferably by a robotic arm 39b. A vacuum is initiated through the bottom of the insert receiving portion 34 by the vacuum line 52 to hold the insert 14 securely. The core 18 and cavity 20 are then reengaged and the system is back in the configuration of FIG. 2a, and the process may be repeated.

The process of the present invention is carried out with a simple core/cavity assembly and does not necessitate the rotation of the core and cavity elements or other portions of the apparatus relative to one another, as is required in prior art composite molding technology. Since the two portions of the composite article are separately injection molded, molding pressures, temperatures and compositions may be optimized for each application.

Figure 3:
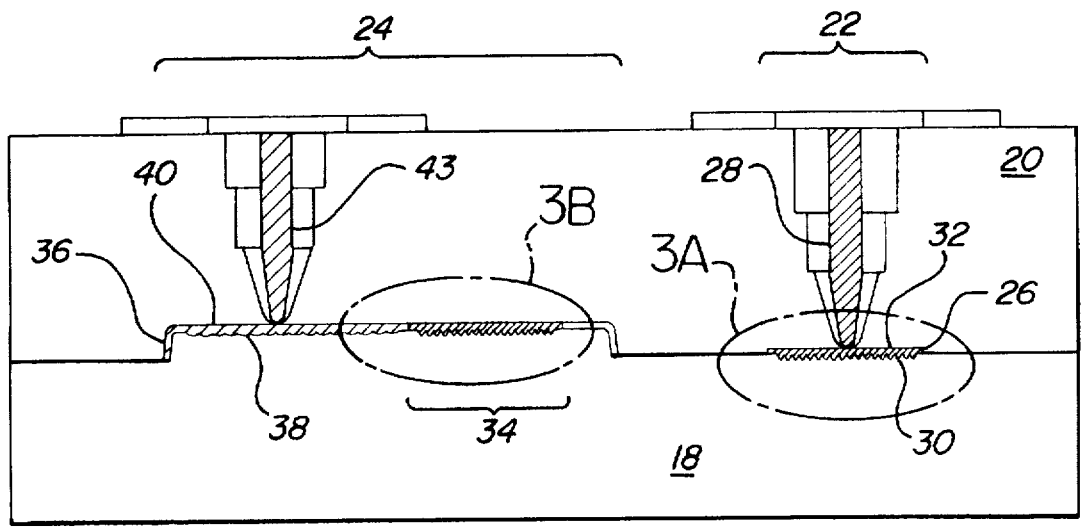
FIG. 3 is a cross sectional view of a core/cavity assembly for use in the present invention.
Figure 3A:
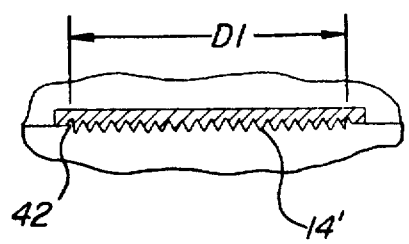
Figure 3B:
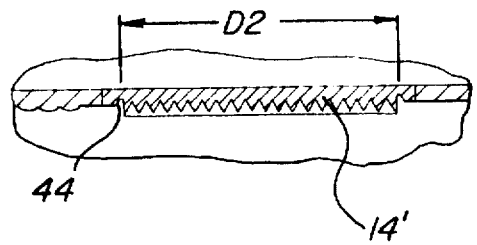

Referring now to FIG. 3, there is shown a more detailed, cross sectional view of the core 18 and cavity 20 at a stage in the molding process corresponding to that shown schematically in FIG. 2b. FIG. 3 incorporates inserts A and B which provide enlarged views of correspondingly labeled portions of the apparatus. The first molding cavity 26 is defined by the core 18 and cavity 20, and as discussed hereinabove includes a textured surface 30 configured to mold the corner cube portion of the reflector of the first insert 14' which is formed therein. In this embodiment, the first mold cavity is further configured to include a groove-defining ridge 42 which is disposed in proximity to the perimeter of the mold cavity 26. As indicated in FIG. 3A, portions of the groove-defining ridge 42 on diametrically opposed portions of the cavity are separated by a distance $d_1$.

FIG. 3 further illustrates the second molding station 24 which includes a second mold cavity 36 having a textured rear surface 38 for molding the light diffusing elements of the light cover, and a front surface 40 for molding a smooth featured surface. FIG. 3 illustrates, in more detail, the insert receiving portion 34 of the second molding station 24 and, as illustrated, the insert 14 is supported therein. It will be noted that the insert receiving portion 34 includes a support ridge 44 (best seen in 3B and in FIG. 4) proximate the perimeter thereof. This support ridge 44 engages a groove which was molded into the insert 14 in the first mold cavity by the groove-defining ridge 42. Diametrically opposed portions of he support ridge 44 are separated by a distance $d_2$ as indicated. In accord with the present invention, applicants have found that it is necessary to fabricate the insert receiving station so that the distance $d_2$ is less than the distance $d_1$ at corresponding locations. This is to allow for shrinkage of the insert as it cools. It is an important feature of the present invention that molding of the insert, and the subsequent molding of the remainder portion of the element onto the insert, are carried out in close spatial and temporal proximity. The fact that a single core and a single cavity member are employed for both molding steps greatly simplifies problems of thermal control, in addition to providing a mechanically simple system. This is in contrast to prior art processes in which a given core member may engage a number of different cavity members in molding a composite article.

It has generally been found that with typically employed acrylic resins there is a shrinkage of approximately 0.001 inch/inch during a typical transfer process. However, shrinkage calculations can vary and are based upon component design, the type of resin employed and the amount of time required for the transfer process. By dimensioning the insert receiving portion to be slightly smaller than the first mold cavity in which the insert is formed, such shrinkage is accommodated.

Figure 4:
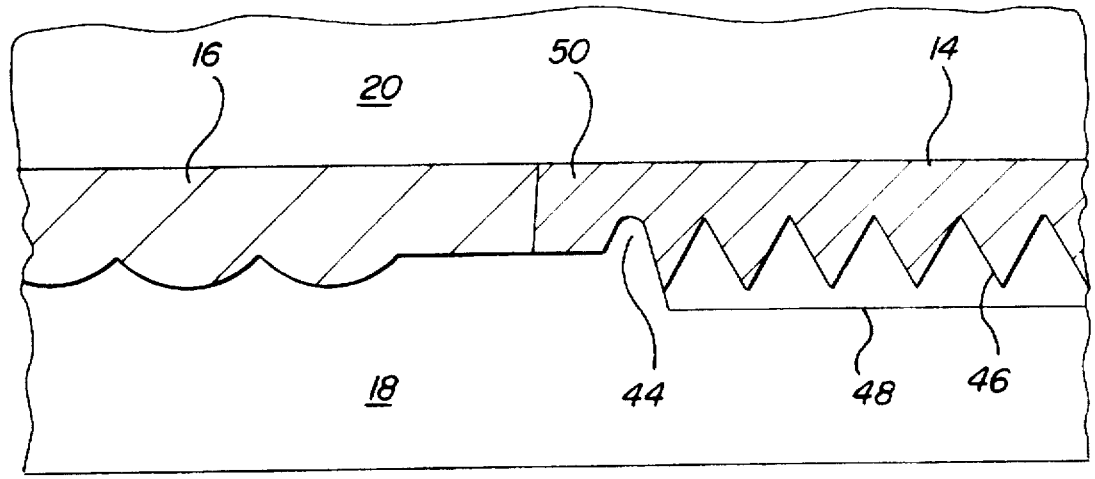
FIG. 4 is an enlarged view of the assembly of FIG. 3 better illustrating the location and function of the support ridge thereof.

Referring now to FIG. 4, there is shown an enlarged, fragmentary view of the core and cavity assembly of FIG. 3 further illustrating the support ridge 44, and the manner in which an insert 14 is supported in the insert receiving portion 34 of the second molding station. It will be noted from FIG. 4 that the insert 14 is supported in the insert receiving portion 34 so that the back surface of the insert 14, having the corner cube elements 46 defined thereupon, is maintained in a spaced apart relationship with the proximate wall 48 of the insert receiving portion 34. It has been found that by spacing the insert 14 from the back wall 48, damage to the corner cube elements 46 is avoided. The amount of spacing will be dependent upon the configuration of item being molded, as well as molding conditions, but in a typical application a spacing of approximately 0.2–0.3 mm has been found sufficient to prevent damage to corner cube elements.

It should also be noted that the support ridge 44 also functions to prevent damage to the optical elements of the insert 14 during subsequent injection molding steps. The support ridge 44 serves to absorb stresses generated when polymeric material is injected into the contiguous second mold cavity. If the support ridge 44 were not present, the combination of temperatures and pressures exerted by the second thermoplastic material injected into the second mold cavity could deform the insert and damage the optical properties thereof. The presence of the support ridge 44 localizes molding stresses in the perimeter region 50 of the insert 14.

Figure 5A:
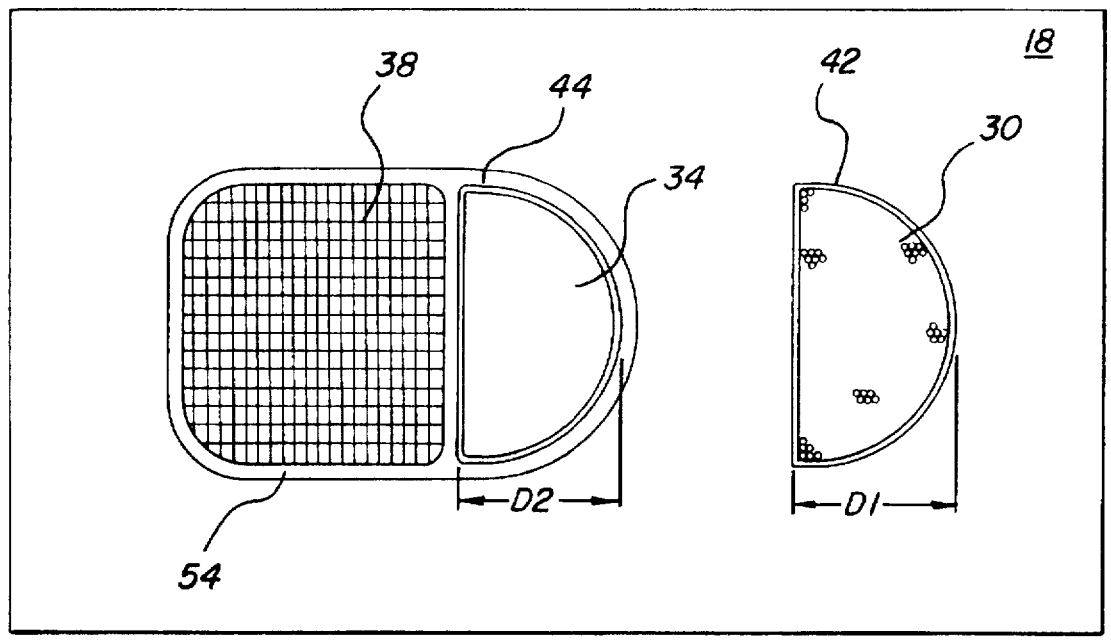
FIG. 5a is a top plan view of a core structured in accord with the principles of the present invention.

Referring now to FIG. 5a, there is shown a top plan view of a core member 18, generally similar to that previously described. The core member 18 includes a textured back surface 30 which is configured to mold the corner cube portion of the first insert. Also visible is the groove-forming ridge 42 discussed with reference to FIG. 3. As indicated, diametrically opposed portions of the groove forming ridge 42 are separated by a distance $d_1$. The core 18 of FIG. 5a further includes a second portion which defines a part of the second molding station. This second portion includes an insert receiving portion 34 having a shape precisely corresponding to an insert member; and, as previously described, includes a support ridge 44 proximate the perimeter thereof. The support ridge 44 has diametrically opposed portions separated by a distance $d_2$, and this distance $d_2$ is less than the corresponding distance $d_1$ in a corresponding portion of the first mold cavity. As previously described, the core 18 cooperates with a corresponding cavity to define a second mold cavity which, in this instance, includes a textured back surface 38, which forms light diffusing elements of the product molded therein. Core 18 is further configured to also mold a perimeter portion of the light cover, and in this regard includes a further configured portion 54.

Figure 5B:
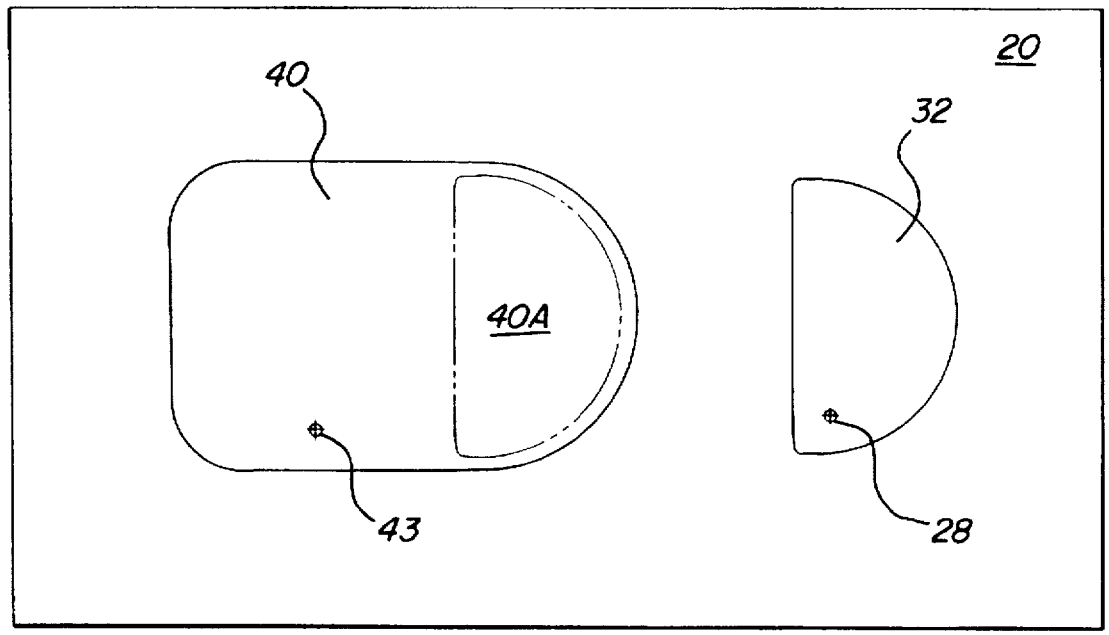
FIG. 5b is a top plan view of a cavity engageable with the core of FIG. 5a and structured in accord with the principles of the present invention.

Referring now to FIG. 5b, there is shown a top plan view of a cavity member 20 configured to engage the core member 18 of FIG. 5a. The cavity member 20 of FIG. 5b includes a first portion which has the front face 32 of the first mold cavity defined therein. As illustrated, this is a smoothly curved face, configured so as to provide the shape of the front surface of an insert. A second portion of the cavity member 20 includes the front face 40 of the second molding station and further includes a subportion 40a, shown in phantom outline, which contacts the front face of an insert which is supported thereagainst by a corresponding core member, for example member 18.

A first injection port 28 and a second injection port 43 are disposed in the cavity member 20, and function to permit the introduction of molten thermoplastic material into a mold cavity defined by said cavity member 20 and a corresponding core member, for example member 18 of FIG. 5a. As depicted in FIG. 5b, the injection ports 28, 43 are disposed so as to inject thermoplastic material in through the front face of the corresponding molded member, and for this reason are typically placed near an edge thereof. When injection is made in this manner, valve gate technology is utilized to make the injection. In other embodiments, edge gate technology may be employed by configuring the cavity in accord with well known techniques. In the instances where edge gate injection is employed, a degating step is preferably implemented after the parts have been removed from the corresponding core and before the insert is transferred to the insert receiving portion of the core member.

While the molding technique and apparatus disclosed herein may be employed in combination with the manufacture of a variety of composite articles, it has particular advantage in the manufacture of precise optical elements such as light covers, and has been explained in that context. In general, light covers of the type disclosed herein are manufactured from acrylics, polycarbonates or other such thermoplastic materials. Injection is typically carried out at a pressure in the range of 500–2000 psi, and typically at temperatures in the range of 400°–600° F. Other pressures and temperatures may be similarly employed depending upon the nature of the polymeric material being injection molded. As mentioned above, it is a notable feature of the present invention that molding conditions, in terms of pressure and temperature, may be optimized and separately controlled for each of the portions of the composite article. While the invention has been described with reference to the manufacture of a composite article comprised of one insert surrounded by an injected volume of thermoplastic material, other variations may be implemented in accord with the teachings herein. For example, the second molding station may be configured to support two inserts therein, so as to manufacture a three part composite article. In other instances, the composite article may be built up in a core/cavity assembly having more than two molding stations defined therein. For example, a first station may be employed to form a first insert, which then has a second body of thermoplastic material molded there around in a second molding station. The composite article produced in the second molding station may then itself function as an insert, and be transferred to a third molding station defined by the core/cavity assembly, and in this third station another body of thermoplastic material may be molded around the composite insert to form a three part article. All of such modifications and variations are within the scope of the present invention.

In view of the foregoing, it is to be understood that the present description and drawings set forth herein are merely illustrative of particular embodiments of the present invention, and are not meant to be limitations upon the practice thereof. It is the following claims, including all equivalents, which define the scope of the invention.

I claim:

1. A transfer molding process for making a composite, molded, thermoplastic member which includes a molded, thermoplastic, retroreflective, insert member contiguous with a second body of molded, thermoplastic material, said method including the steps of:

A. providing a mold assembly comprising:
  a core member and a cavity member engageable therewith to define a first and second molding station;
  said first molding station including a first mold cavity having a shape corresponding to a retroreflective insert member having a plurality of corner cube elements defined thereupon, and a first injection port in fluid communication with said first mold cavity;
  said second molding station including: an insert receiving portion defined therein which is configured to support a retroreflective insert member therein so that the corner cube elements thereof are maintained in a spaced apart relationship with said mold assembly, a second mold cavity contiguous with said insert receiving portion, and a second injection port in fluid communication with said second mold cavity;

B. disposing a first retroreflective insert member in the insert receiving portion of said second molding station;

C. injecting a first volume of molten, thermoplastic polymer through said first injection port and into said first mold cavity so as to form a second retroreflective insert member;

D. injecting a second volume of molten, thermoplastic material through said second injection port and into said second mold cavity, so as to form a second body of thermoplastic material contiguous with said first retroreflective insert; whereby a composite, molded, thermoplastic member incorporating said first retroreflective insert is formed;

E. removing said composite, molded, thermoplastic member from said second molding station; and F. transferring said second retroreflective insert member from said first mold cavity to the insert receiving portion of said second molding station.

2. A molding process as in claim 1, wherein the step of injecting the first volume of molten, thermoplastic polymer and the step of injecting the second volume of molten, thermoplastic polymer are carried out substantially simultaneously.

3. A molding process as in claim 1, wherein said first volume of molten, thermoplastic polymer is injected at a temperature which is different from the temperature at which said second volume of molten, thermoplastic polymer is injected.

4. A molding process as in claim 1, wherein the pressure at which the first volume of molten, thermoplastic polymer is injected is different from the pressure at which the second volume of molten, thermoplastic polymer is injected.

5. A molding process as in claim 1, wherein the step of injecting the first volume of molten, thermoplastic polymer comprises injecting a first thermoplastic polymer having a color different from the second molten, thermoplastic polymer.

6. A molding process as in claim 1, wherein the step of removing the composite, molded, thermoplastic member and the step of transferring the second retroreflective insert are implemented by a robot.

7. A molding process as in claim 1, wherein the steps of injecting said first volume of molten, thermoplastic polymer and said second volume of molten, thermoplastic polymer each further include injecting said molten, thermoplastic polymer at a temperature in the range of 400°–600° F. and at a pressure in the range of 500–2000 psi.

8. A transfer molding apparatus for making a composite, molded, thermoplastic member comprising a retroreflective insert member formed from a first body of thermoplastic material which is contiguous with a second body of thermoplastic material, said apparatus comprising:

a mold assembly including a core member and a cavity member engageable therewith so as to define a first and a second molding station;
said first molding station including a first mold cavity having a shape corresponding to a retroreflective insert member having a plurality of corner cube elements defined thereupon, and a first injection post in fluid communication with said first mold cavity;
said second molding station including: an insert receiving portion defined therein which is configured to support a retroreflective insert member so that the corner cube elements thereof are maintained in a spaced apart relationship with said mold assembly, a second mold cavity contiguous with the insert receiving portion, and a second injection port in fluid communication with said second mold cavity;

transfer means for transferring a molded, thermoplastic insert member from said first mold cavity to the insert receiving portion of the second molding station.

9. An apparatus as in claim 8, wherein the insert receiving portion of the second mold cavity has a shape corresponding to the first mold cavity, but is smaller in length and width than is said first mold cavity so as to accommodate shrinkage of an insert member which has cooled after having been molded in said first mold cavity.

10. An apparatus as in claim 8, wherein the insert receiving portion of the second mold cavity includes an annular support ridge proximate the perimeter thereof for supporting the retroreflective insert member, and for localizing molding stresses in a perimeter region thereof.

11. An apparatus as in claim 8, wherein said second mold cavity is configured to mold a light dispersive element.

12. An apparatus as in claim 8, further including injector means in fluid communication with the first injection port and the second injection port.

13. An apparatus as in claim 12, wherein said injector means is operative to deliver a volume of molten, thermoplastic material of a first composition to said first injection port, and a volume of molten, thermoplastic material of a second composition, different from said first composition, to said second injection port.

14. An apparatus as in claim 12, wherein said injector means is operative to deliver molten, thermoplastic material to said first injection port at a first temperature, and to said second injection port at a second temperature, different from said first temperature.

15. An apparatus as in claim 12, wherein said injection means is operative to deliver molten, thermoplastic material to said first injection port at a first pressure, and to said second injection port at a second pressure, different from said first pressure.

16. An apparatus as in claim 12, wherein said injection means is operative to deliver molten thermoplastic material to said first injection port and said second injection port at a temperature in the range of 400°–600° F.

17. An apparatus as in claim 12, wherein said injection means is operative to deliver molten thermoplastic material to said first injection port and said second injection port at a temperature in the range of 500–2000 psi.

* * * * *